United States Patent Office 3,510,545
Patented May 5, 1970

3,510,545
METHOD OF MANUFACTURING NUCLEAR
FUEL RODS
Atsushi Nishiyama, Kawachi, and Toshio Kasamatsu, Nishinomiya, Japan, assignors to Sumitomo Electric Industries, Ltd., Osaka, Japan, a company of Japan
No Drawing. Original application Dec. 11, 1964, Ser. No. 417,719, now Patent No. 3,372,213, dated Mar. 5, 1968. Divided and this application Dec. 8, 1967, Ser. No. 688,966
The portion of the term of the patent subsequent to Mar. 5, 1985, has been disclaimed
Int. Cl. G21c 21/08, 3/04
U.S. Cl. 264—.5                              4 Claims

ABSTRACT OF THE DISCLOSURE

A method of manufacturing nuclear fuel rods having a prolonged fuel life wherein there is provided a homogeneous mixture of powders of an oxide nuclear fuel and a metallic boride of any one or more of $TiB_2$, $ZrB_2$, $CrB_2$, $NbB_2$ and $VB_2$, as a burnable poison, compacted at a desired pressure followed by sintering at a high temperature after which the sintered product is pulverized into different grain sizes, if desired, and placed into a nuclear fuel cladding tube by the vibratory compacting technique.

CROSS-REFERENCE TO RELATED APPLICATION

This application is a division of application Ser. No. 417,719 filed Dec. 11, 1964 and now U.S. Pat. No. 3,372,-213, directed to the method of manufacturing nuclear fuel material containing metallic boride as a burnable poison.

BACKGROUND OF THE INVENTION

The present invention relates to a method of manufacturing a new nuclear fuel rod containing a burnable poison wherein there is provided a homogeneous nuclear fuel material such as uranium dioxide containing a burnable poison comprising a boron compound by mixing, pressing and sintering.

Many attempts have been made in the past in an effort to obtain an economically advantageous nuclear fuel by prolonging the fuel life through the addition of a burnable poison to the nuclear fuel element. No real success has yet been achieved in such attempts, it being technically difficult to maintain a burnable poison in a nuclear fuel compound of, for instance, uranium dioxide.

For the purpose of having boron contained in uranium dioxide as a burnable poison, the oxide, carbide, nitride, etc. of boron have been used in the past. However, these compounds lack chemical stability. For instance, if an attempt is made to have a boron compound contained in sintered uranium dioxide, it either reacts with uranium dioxide or becomes decomposed during the sintering process, so that it is almost impossible to have such a boron compound retained in the end sintered product. No method in the manufacture or fabrication of nuclear fuel rods has so far been discovered for making a sintered product of a suitable burnable poison for addition to or containing nuclear fuel material or to obtain the suitable burnable poison containing nuclear fuel by the vibratory compaction of a homogeneous powder mixture of a burnable poison and nuclear fuel compound. Although methods are known in which boron is added directly into the stainless steel cladding tube which contains the nuclear fuel material, they do not make it possible to disperse the burnable poison uniformly in the nuclear fuel material, thus failing to let the burnable poison act efficiently.

SUMMARY OF INVENTION

The present invention eliminates the above mentioned difficulties by using a metallic boride as a burnable poison and producing a homogeneous mixture in a sintered product consisting of a ceramic nuclear fuel material comprising one or more of the following dioxides, such as, uranium dioxide, plutonium dioxide, thorium dioxide, uranium dioxide-thorium dioxide solid solution, uranium dioxide-plutonium dioxide solid solution, etc. as nuclear fuel compounds. A metallic boride, such as $TiB_2$, $ZrB_2$, $CrB_2$, $NbB_2$, $VB_2$, etc. is used as a boron compound, and this and the ceramic powder of a nuclear fuel compound, uranium dioxide, for example, are uniformly mixed and sintered. If the metallic boride and ceramic powder are sintered in a hydrogen or inert gases in the sintering process, the boron content after sintering is remarkably decreased owing to the small quantity of impurities existing in the sintering atmosphere and it is found to have been difficult to obtain a stabilized product. The present invention, however, secures a constant amount of the boron additive in the nuclear fuel by sintering in a high degree of vacuum $10^{-3}$ mm. Hg or higher, at a sintering temperature of 1,500° C. or higher; the compacted product obtained by compacting under a pressure of 3 t./cm.$^2$ or more is a uniform homogeneous mixture of the metallic boride and ceramics powder.

By employment of the above mentioned method it is made possible to eliminate almost entirely the reaction between the metallic boride and the nuclear fuel compound, so that it is possible to disperse a requisite quantity of a boride of a fixed grain size in the oxide nuclear fuel material as a burnable poison by selectively employing the requisite quantity of a metallic boride of the desired grain size.

In manufacturing oxide nuclear fuel rods under the present invention, the homogeneous oxide nuclear fuel, such as uranium dioxide, and a metallic boride are sintered under conditions that prevent the latter from decomposing and becoming lost during the sintering process.

A practical embodiment for preparing nuclear material acceptable under the confines of the present invention is as follows:

A requisite quantity of a metallic boride is added to $UO_2$ powder, and these two are mixed uniformly enough in such a mixer as a ball mill or V-type mixer. This mixed powder is compacted into cylindrical pellets, 10–20 mm. in diameter and 10–20 mm. in length, under a compacting pressure of 3–5 t./cm.$^2$ by means of a hydraulic press or mechanical press like on which is commonly used in powder metallurgy. The pellets thus obtained are placed in a sintering furnace and are heated for about 2–3 hours at a sintering temperature of 1,600–1,700° C. in a vacuum of $10^{-3}$ mm. Hg or a higher degree. Time required for raising the temperature is about 3–4 hours and cooling is effected by leaving the pellets in the furnace until they come down to a room temperature.

The boron content of the sintered material obtained was investigated by chemical analysis and it was found that boron contained was in about the same quantity as it had been added. It has thus been confirmed that its quantity remaining contained is satisfactory.

If the addition of a metallic boride in accordance with the method of this invention is in a quantity exceeding 1%, a lowering of the sintered density occurs due to a lower content of $UO_2$ present. On the other hand, if the sintering temperature is 1,500° C. or lower, good fuel pellets will not be obtained, either. If the degree of the vacuum is less than $10^{-3}$ mm. Hg, there is a tendency that the boron compound remaining contains less of the boron compound. The quantity of boron compound remaining also showed a decrease where material compacted under a lower compacting pressure was sintered.

It is preferable that the grain size of the boron compound used as a burnable poison is within the range of one-several hundred μ. If the grain size is too great, the sintered material is apt to become cracked. If it is too small, the quantity of boron compound remaining will be less.

The method of manufacturing nuclear fuel material according to this invention makes it possible to manufacture, in a very stable way, a nuclear fuel sintered material containing a desired amount of boron, there taking place little reaction between the metallic boride and the nuclear fuel compound and the melting point of the boron compound being high. This application is very efficient with all the ceramic nuclear fuel materials such as uranium dioxide, plutonium dioxide, thorium dioxide, uranium dioxide-thorium dioxide solid solution, uranium dioxide-plutonium dioxide solid solution, etc.

A nuclear fuel material can be produced in a most safe and efficient way by placing the pellets of burnable poison containing nuclear fuel material obtained in this way in a stainless steel or zinc alloy cladding tube commonly in use.

The present invention is directed specifically to the nuclear fuel rod made from the homogeneous mixture referred to above without losing the effectiveness of the burnable poison.

Generally speaking, the method of manufacturing a nuclear fuel rod in which a nuclear fuel material in a powdery condition is filled in a nuclear fuel cladding tube by the vibratory compacting technique is considered to be a hopeful method from the economical point of view because a reduction in manufacturing cost can be expected.

The method in which the burnable poison and oxide nuclear fuel are uniformly mixed and thereafter filled in the nuclear fuel cladding tube is readily known in the art. It is generally known that in filling a nuclear fuel cladding tube of requisite dimensions, the most efficient way of effective filling of high density is to use a powder consisting of particles of about three different grain sizes and disperse them uniformly.

As regards the above mentioned three different kinds of grain sizes, it is considered that particles having a diameter of 50–100μ or −325 mesh are suitable for the finest particles, those having a diameter of about −42 +100 mesh suitable for medium particles and those have a diameter of about −5 +10 mesh for the largest particles.

For the filling with a uniform mixing of burnable poison and oxide nuclear fuel, the uniformity of mixing was found still insufficient if oxide nuclear fuel or burnable poison of the said medium or maximum size was used. The burnable poison was not effective enough in such a case.

In order to overcome the above mentioned difficulty experienced in the past, it is possible to obtain a homogeneous powder of burnable poison containing nuclear fuel material of any one of the desired grain sizes by pulverizing the sintered material of the burnable poison containing nuclear fuel which is obtainable by the sintering method above disclosed. Thus it is possible to furnish easily and economically a burnable poison containing nuclear fuel rod of a uniform high density by filling a nuclear fuel cladding tube made of stainless steel or zinc alloy with burnable poison containing nuclear fuel material of the said three grain sizes by the vibratory compacting technique.

The following examples are of practical application wherein the above mentioned vibratory compacting technique is employed to produce nuclear fuel rods comprising this invention.

EXAMPLE I

Fused $UO_2$ powder of −325 mesh and $ZrB_2$ powder of 50–100μ were uniformly mixed at weight ratio of 1/15% in boron content and, after sintering, pulverized to a grain size of −325 mesh. Three kinds of powder, namely 15% of this powder, 20% of fused $UO_2$ powder of −42 +100 mesh and 65% of fused $UO_2$ powder of −5 +10 mesh, were uniformly mixed and a stainless steel tube, 12.5 mm. in diameter, 0.5 mm. in wall thickness and 1.5 mm. in length, was filled with this mixture by the vibratory compacting technique. In this way we were successful in manufacturing fuel rods having a filling density of 86–88% of theoretical density and containing 0.1% boron. As a result of chemical analysis, it has been ascertained that the burnable poison in the above mentioned fuel rods is dispersed uniformly in the longitudinal direction.

EXAMPLE II

In Example I, $ZrB_2$ powder was used to make the finest particles. In this example, however, such borides as $ZrB_2$, $TiB_2$, $CrB_2$, $NbB_2$, etc. of a boron content of 0.01–1% were combined with $UO_2$ powder. Fine powder being used, after sintering, nuclear fuel rods of excellent boron dispersion were obtained by the vibratory compacting technique in quite the same way as in Example I.

EXAMPLE III 0.1% by weight of $ZrB_2$ powder as a boron additive was added to and mixed with ceramic uranium dioxide powder, which was compacted into pellets, 15 mm. in diameter and 15 mm. in length, by a hydraulic press under a compacting pressure of 3 t./cm.$^2$ or more. These pellets were given sintering treatment for 2 hours, being heated to 1,600° C. in a high vacuum atmosphere of $10^{-4}$ mm. Hg. A good sintered product of 10.4 g./cc. density was thus obtained.

According to the results of chemical analysis of the above mentioned sintered material, the boron content amounted to 0.08–0.10%. The grain size of the dispersed and added $ZrB_2$ powder was within quite the same range of grain sizes as was before sintering, namely 5–20μ. The sintered product was pulverized into powders having the three grain sizes of −325 mesh, −42 +100 mesh and −5 +10 mesh respectively. These powders were uniformly mixed in quantities of 15%, 20%, and 65% respectively, in the same way as in Example II. Fuel rods were made by filling stainless steel tubes with this mixture by the vibratory compacting technique.

In this case, the density of the powder was lower than the theoretical density of the said sintered material, so that the density upon vibratory compaction was 80–84% of the theoretical density.

In this case, every particle of the powder used contained burnable poison, so that the uniformity of the dispersion of boride in the fuel rod was exceedingly good.

As has been stated, the present invention is to furnish a nuclear fuel rod of a high efficiency having a long life as a nuclear fuel, little reaction taking place between metallic boride as burnable poison and oxide nuclear fuel upon sintering, the melting point of the boride being high and the boron dispersed uniformly throughout the sintered nuclear fuel material and remaining as such during vibratory compaction.

We claim:

1. A method of manufacturing nuclear fuel rods having prolonged fuel life which comprises the steps of mixing a powder of oxide nuclear fuel selected from the group consisting of uranium dioxide, plutonium dioxide, thorium dioxide, and mixtures thereof, and the powder of at least one of $TiB_2$, $ZrB_2$, $CrB_2$, $NbB_2$ and $VB_2$, compacting the mixture under a compacting pressure of at least 3 t./cm.$^2$, sintering the compacted mixture at a temperature of at least 1,500° C. in a high degree of vacuum of at least $10^{-3}$ mm. Hg, pulverizing the sintered mixture, and filling a nuclear fuel cladding tube with the pulverized powder of the sintered mixture by the vibratory compacting technique.

2. A method of manufacturing nuclear fuel rods having prolonged fuel life which comprises the steps of mixing the powder of uranium dioxide and the powder of at least one of $TiB_2$, $CrB_2$, $NbB_2$ and $VB_2$, compacting the mixture under a compacting pressure of at least 3 t./cm.$^2$, sintering the compacted mixture at a temperature of at least 1,500 C. in a high degree of vacuum of at least $10^{-3}$ mm. Hg, pulverizing the sintered mixture, and filling a nuclear fuel cladding tube with the pulverized powder of the sintered mixture by the vibratory compacting technique.

3. A method of manufacturing nuclear fuel rods having prolonged fuel life which comprises the steps of mixing the powder of uranium dioxide and the powder of at least one of $TiB_2$, $CrB_2$, $NbB_2$, and $VB$, compacting the mixture under a compacting pressure of at least 3 t./cm.$^2$, sintering the compacted mixture at a temperature of at least 1,500° C. in a high degree of vacuum of at least $10^{-3}$ mm. Hg. pulverizing the sintered mixture, and filling a nuclear fuel cladding tube of zinc alloy with the pulverized powder of the sintered mixture by the vibratory compacting technique.

4. A method of manufacturing nuclear fuel rods which comprises the steps of mixing a powder of oxide nuclear fuel selected from the group consisting of uranium dioxide, plutonium dioxide, thorium dioxide, and mixtures thereof and the power of at least one of $TiB_2$, $ZrB_2$, $CrB_2$, $NbB_2$ and $VB_2$, compacting the mixture under a compacting pressure of at least 3 t./cm.$^2$, sintering the compacted mixture at a temperature of at least 1,500° C. in a vacuum atmosphere of at least $10^{-3}$ mm. Hg, pulverizing the sintered mixture, providing additional sintered pulverized mixtures in accordance with the previous steps, each mixture consisting of particles of different grain sizes, uniformly mixing together the mixtures of different desired grain sizes to form a compound mixture and filling a nuclear fuel cladding tube with the compound mixture by the vibratory compacting technique.

References Cited

UNITED STATES PATENTS

| | | | |
|---|---|---|---|
| 3,042,594 | 7/1962 | Hauth | 264—.5 |
| 3,051,566 | 8/1962 | Schwartz | 264—.5 |
| 3,263,004 | 7/1966 | Bean | 264—.5 |
| 3,329,744 | 7/1967 | Kaufmann et al. | 264—.5 |
| 3,356,618 | 12/1967 | Rich et al. | 176—93 |

CARL D. QUARFORTH, Primary Examiner

M. J. SCOLNICK, Assistant Examiner

U.S. Cl. X.R.

176—69, 93; 252—301.1